(12) United States Patent
Yu

(10) Patent No.: US 12,506,624 B2
(45) Date of Patent: Dec. 23, 2025

(54) IoT DEVICE AUTHENTICATED BASED ON DYNAMICALLY RECONFIGURABLE PUF AND SERVER AND METHOD FOR AUTHENTICATING THE SAME

(71) Applicant: Electronics and Telecommunications Research Institute, Daejeon (KR)

(72) Inventor: SungJin Yu, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 143 days.

(21) Appl. No.: 18/421,148

(22) Filed: Jan. 24, 2024

(65) Prior Publication Data
US 2025/0097055 A1   Mar. 20, 2025

(30) Foreign Application Priority Data
Sep. 14, 2023   (KR) .......................... 10-2023-0122642

(51) Int. Cl.
*G06F 21/62* (2013.01)
*H04L 9/32* (2006.01)
*G06F 16/11* (2019.01)

(52) U.S. Cl.
CPC .................................. *H04L 9/3278* (2013.01)

(58) Field of Classification Search
CPC ............................ H04L 9/0866; H04L 9/3278
See application file for complete search history.

(56) References Cited

U.S. PATENT DOCUMENTS 9,875,378 B2 * 1/2018 Benoit .................... G06F 21/79
11,127,694 B2 * 9/2021 Kozicki ................. H10B 63/30
(Continued)

FOREIGN PATENT DOCUMENTS

KR   10-2014-0142951 A   12/2014
KR   10-2015-0135032 A   12/2015
(Continued)

OTHER PUBLICATIONS

Zhenhua Liu, et al., "A Physically Secure Lightweight Three-Factor and Anonymous User Authentication Protocol for IoT", IEEE Access, Oct. 27, 2020, 15pages.
(Continued)

*Primary Examiner* — Gary S Gracia
(74) *Attorney, Agent, or Firm* — Sughrue Mion, PLLC

(57) ABSTRACT

An Internet of Thing (IoT) device generates a first response value corresponding to a previously registered first challenge value by using a WPUF, generates a current session key based on the first response value, transmits the current session key to an authentication server by encrypting the current session key into a first random number, receives, from the authentication server, some of a previously registered CRP transmitted by the authentication server as the authentication server authenticates the IoT device based on the first random number and the session key and a second random number, generates a second response value corresponding to a second challenge value, among the some of the CRP, by using an RPUF, authenticates the authentication server by comparing the second response value with the some of the CRP, and then updates the session key, the second challenge value, and the second response value for a next session.

20 Claims, 8 Drawing Sheets

(56) References Cited

U.S. PATENT DOCUMENTS

| | | | |
|---|---|---|---|
| 11,329,835 B2* | 5/2022 | Kim | H04L 9/3273 |
| 11,388,013 B2* | 7/2022 | Razi | H04L 9/3278 |
| 11,722,887 B2* | 8/2023 | Xie | H04W 12/02 |
| | | | 380/27 |
| 11,935,843 B2* | 3/2024 | Kozicki | G09C 1/00 |
| 2017/0149572 A1 | 5/2017 | Wallrabenstein | |
| 2018/0013431 A1* | 1/2018 | Bury | H01L 21/326 |
| 2019/0109829 A1* | 4/2019 | Kim | H04L 9/0861 |
| 2021/0036873 A1* | 2/2021 | Kim | H04L 9/3278 |
| 2022/0337435 A1* | 10/2022 | Kaufmann | H04L 9/3278 |
| 2023/0032099 A1* | 2/2023 | Zheng | H04L 9/14 |
| 2023/0075612 A1* | 3/2023 | Xie | H04W 84/18 |
| 2023/0180002 A1* | 6/2023 | Hwang | H04L 63/062 |
| | | | 726/6 |
| 2023/0216838 A1* | 7/2023 | Plusquellic | H04L 9/3278 |
| | | | 726/7 |
| 2023/0412626 A1* | 12/2023 | Wright | H04L 41/16 |
| 2024/0171412 A1* | 5/2024 | Wang | H04L 9/3278 |
| 2024/0214224 A1* | 6/2024 | Cambou | H04L 9/3278 |
| 2024/0348436 A1* | 10/2024 | Cambou | H04L 9/0866 |
| 2024/0430087 A1* | 12/2024 | Cambou | H04L 9/0866 |
| 2025/0097055 A1* | 3/2025 | Yu | H04L 9/0866 |

FOREIGN PATENT DOCUMENTS

| | | |
|---|---|---|
| KR | 10-2125133 B1 | 6/2020 |
| KR | 10-2020-0104084 A | 9/2020 |
| KR | 10-2021-0015264 A | 2/2021 |
| KR | 10-2021-0072711 A | 6/2021 |
| KR | 10-2021-0083992 A | 7/2021 |
| KR | 10-2021-0106780 A | 8/2021 |
| KR | 10-2021-0153419 A | 12/2021 |
| KR | 10-2364649 B1 | 2/2022 |
| KR | 10-2023-0056151 A | 4/2023 |

OTHER PUBLICATIONS

Gope et al., "A Privacy-Aware Reconfigurable Authenticated Key Exchange Scheme for Secure Communication in Smart Grids", IEEE Transactions on Smart Grid, 2021, pp. 1-14.

* cited by examiner

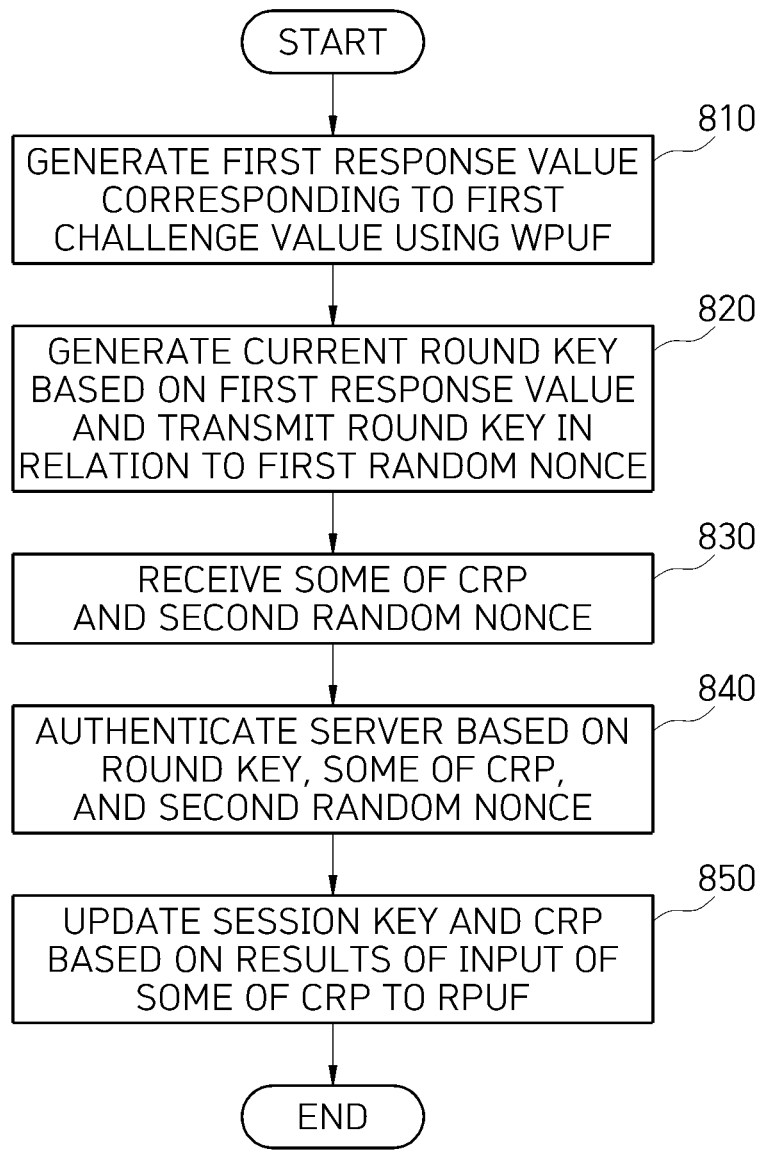

IoT DEVICE AUTHENTICATED BASED ON DYNAMICALLY RECONFIGURABLE PUF AND SERVER AND METHOD FOR AUTHENTICATING THE SAME

CROSS-REFERENCE TO RELATED APPLICATIONS

This application claims priority under 35 U.S.C. § 119 to Korean Patent Application No. 10-2023-0122642, filed on Sep. 14, 2023, in the Korean Intellectual Property Office, the disclosure of which is incorporated herein by reference in its entirety.

BACKGROUND

1. Technical Field

This disclosure is related to a technology for authenticating an Internet of Thing (IoT) device based on a physical unclonable function (PUF).

2. Related Art

With the development of artificial intelligence and the 5G technology, leading edge IoT devices newly emerge, accelerate the development of several industries, and create new services. The IoT device has low specification performance and thus applies a lightweight password primitive instead of a password primitive that supports many computing operations.

A conventional IoT device retains an encryption key in non-volatile memory (NVM). Accordingly, the encryption keys stored in the conventional IoT device may be exposed to an attacker by physical attacks. In this case, duplicated ICs may be generated and data (e.g., sensitive information such as a user's lifestyle or routine) collected by the IoT device may be exposed, which may be used for the purpose of a violation of privacy or crime. As described above, the leading edge IoT device provides innovative convenience by providing new services, but also causes economic and industrial losses due to its illegal duplication.

In order to solve such problem, a physical unclonable function (PUF) technology that provides a physical duplication function has emerged. The PUF is a technology which enables each IoT device to have a unique and unpredictable digital value like bio information, such as a human's iris or fingerprint. Specifically, the PUF is a technology based on the fact that physical unique characteristics of devices cannot be duplicated and implemented because the devices provide different digital values although the devices are manufactured by the same process.

If the PUF technology is implemented within an IoT device and used for authentication, the IoT device itself may generate a unique identifier without the need to inject the identifier of each IoT device from the outside. Furthermore, a cost can also be reduced because the IoT device does not need to embed non-volatile memory therein for storing the identifier.

An input and output pair of each PUF circuit has been previously stored in a database of an authentication server as a challenge-response pair (CRP), and may be used to verify the legality of each IoT device. The CRP in the database is used to verify the legality of each IoT device by being compared with a CRP that is subsequently generated through the PUF of the IoT device to be authenticated.

SUMMARY

However, a conventional PUF mechanism may be vulnerable to a machine learning-based modeling attack because the CRP is retained in an authentication server. Specifically, if some CRP of the PUF is exposed from the authentication server due to hacking or a security threat, an attacker may predict the PUF based on the exposed CRP by using a machine learning algorithm, such as a support vector machine (SVM) or logistic regression.

Aspects of the present disclosure are to address at least the above-mentioned problems and/or disadvantages and to provide at least the advantages described below. Accordingly, an aspect of the present disclosure is to provide an IoT device, an authentication server, and an IoT authentication method which perform PUF-based authentication.

In accordance with an aspect of the present disclosure, an Internet of Thing (IoT) device may include memory in which at least one instruction is stored, and a processor functionally connected to the memory. By executing the at least one instruction, the processor may generate a first response value corresponding to a first challenge value that has been previously registered by using a weak physical unclonable function (WPUF), may generate a current session key based on the first response value and transmit the current session key to an authentication server by encrypting the current session key into a first random number, may receive, from the authentication server, some of a challenge-response pair (CRP) being previously registered when the authentication server authenticates the IoT device based on the first random number and the session key, may generate a second response value corresponding to a second challenge value, among the some of the CRP, by using a reconfigurable physical unclonable function (RPUF), and may authenticate the authentication server by comparing the second response value with the some of the CRP and then update the session key, the second challenge value, and the second response value for a next session.

Furthermore, in accordance with an aspect of the present disclosure, an authentication server for authenticating an IoT device may include a database in which authentication-related data of at least one IoT device that has been previously registered is stored and a processor functionally connected to the database. The processor may receive, from a first IoT device, a first response value that is generated and encrypted from a first challenge value that is transmitted by the first IoT device and that is selected through a weak physical unclonable function (WPUF) of the first IoT device for an authentication request, a pseudo identity, and a first random number, may obtain a first response value, a second challenge value, a second response value, and a session key corresponding to the received pseudo identity, among the authentication-related data, may authenticate the first IoT device by comparing the obtained first response value with the received first response value based on the obtained session key, and may update authentication-related data including the second challenge value and the second response value for a next session by using a reconfigurable physical unclonable function (RPUF) of the first IoT device.

Furthermore, in accordance with an aspect of the present disclosure, an IoT authentication method based on a physical unclonable function (PUF) by an IoT device may include generating a first response value corresponding to a first challenge value by using a weak physical unclonable function (WPUF), generating a current session key based on the first response value and then transmitting the current session key to an authentication server in relation to a first random number, receiving some of a challenge-response pair (CRP), which has been previously registered and is transmitted by the authentication server as results of authentication of the authentication server based on the first random number and the session key, and a second random number from the authentication server, authenticating the authentication server based on the session key, the some of the CRP, and the second random number, generating a second response value corresponding to a second challenge value, among the some of the CRP, by using a reconfigurable physical unclonable function (RPUF), and authenticating the authentication server by comparing the second response value with the some of the CRP and then updating the session key and the CRP for a next session.

According to various embodiments of the present disclosure, the security of authentication based on the PUF for an IoT device can be reinforced. In addition, various effects which may be checked directly or indirectly through this document may be provided.

BRIEF DESCRIPTION OF THE DRAWINGS

FIG. 8 illustrates a flowchart of an IoT authentication method based on the PUF by an IoT device according to an embodiment.

In relation to the description of the drawings, the same or similar reference numeral may be used for the same or similar component.

DETAILED DESCRIPTION

According to an embodiment of present disclosure, an IoT device authentication method can guarantee security against a potential security attack and handle a machine learning-based modeling attack by using a reconfigurable physical unclonable function (RPUF), capable of dynamically reconfiguring a CRP value of a PUF without the intervention of a user, and a weak PUF (WPUF) in which entropy cells are independent from each other and support a low bit error rate (BER).

Figure 1:
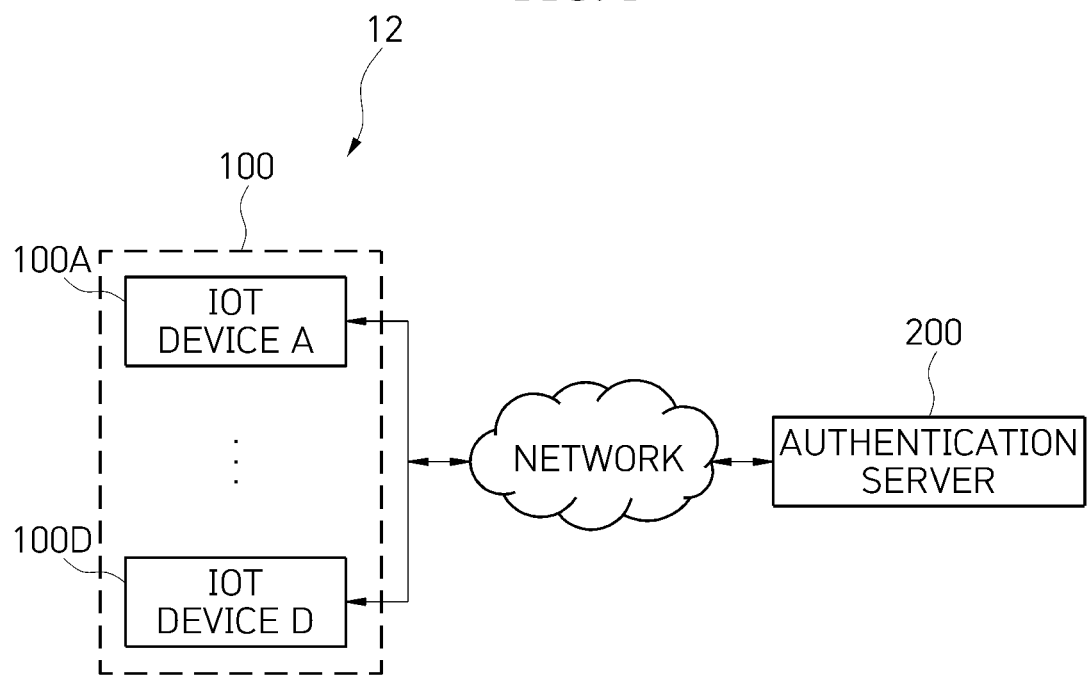
FIG. 1 illustrates an implementation environment for an IoT authentication system based on a PUF according to an embodiment.

FIG. 1 illustrates an implementation environment for an IoT authentication system based on a PUF according to an embodiment.

Referring to FIG. 1, an IoT authentication system 12 according to an embodiment may include at least one IoT devices 10 and an authentication server 200.

According to an embodiment, each IoT device 100 may provide various services based on the IoT. An IoT device (e.g., 100A) may be registered as a legitimate service device via authentication based on the PUF before providing the services. An IoT device (e.g., 100A) according to an embodiment may include a WPUF circuit and an RPUF circuit.

According to an embodiment, each IoT device 100 may generate a first response value corresponding to a first challenge value that has been previously registered by using a weak physical unclonable function (WPUF), may generate a current session key based on the first response value, may transmit the current session key to the authentication server 200 by encrypting the current session key into a first random number, may receive some of a challenge-response pair (CRP) that has been previously registered and a second random number, which are transmitted by the authentication server 200 as the authentication server 200 authenticates each IoT device 100 based on the first random number and the session key, from the authentication server 200, may generate a second response value corresponding to a second challenge value, among some of the CRP, by using the RPUF, may authenticate the authentication server 200 based on the second response value and some of the CRP, and may update the session key, the second challenge value, and the second response value for a next session.

According to an embodiment, the authentication server 200 may receive the first response value that has been generated and encrypted from the first challenge value selected through the WPUF of each IoT device 100, a pseudo identity, and the first random number from the IoT device 100, may obtain the first response value, the second challenge value, the second response value, and the session key corresponding to the received pseudo identity, among authentication-related data, may authenticate the IoT device 100 by comparing the obtained first response value and the received first response value based on the obtained session key, and may update authentication-related data including the second challenge value and the second response value for a next session by using the WPUF of the IoT device 100.

Figure 2:
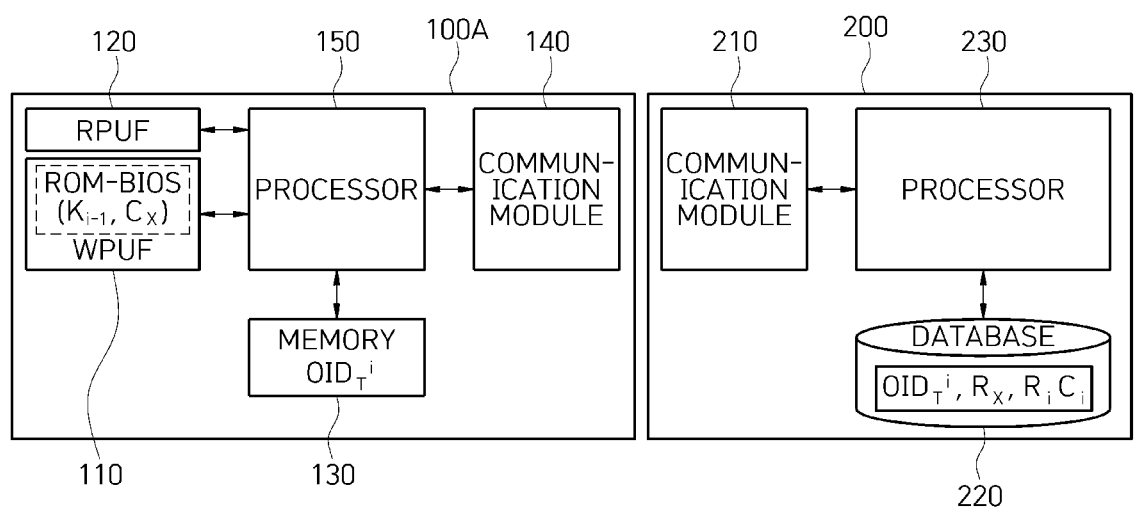
FIG. 2 illustrates a block diagram of an IoT device and an authentication server according to an embodiment.

FIG. 2 illustrates a block diagram of an IoT device and an authentication server according to an embodiment.

Referring to FIG. 2, an IoT device (e.g., 100A) according to an embodiment may include a WPUF circuit 110, an RPUF circuit 120, memory 130, a communication module 140, and a processor 150. In an embodiment, some components of an IoT device (e.g., 100A) may be omitted, or an additional component may be further included in the IoT device (e.g., 100A). Furthermore, some of the components of the IoT device (e.g., 100A) may be combined to constitute one entity, but may perform the same function as that of the corresponding components prior to the combination.

The WPUF circuit 110 may be constructed to have entropy cells that are independent from each other and to have a low bit error rate less than a specified ratio. When being input or receiving a first challenge value, the WPUF circuit 110 may generate a bit string (may be hereinafter referred to as a "first response value ($R_x$)") that is unique and is time-non-varying due to the deviation of a manufacturing process. The first response value may be used to generate a round key, that is for example, a private key to be used for authentication of each session.

The RPUF circuit 120 may include a PUF array which may be reconfigured based on a combination of inverters. When being input or receiving a second challenge value, the RPUF circuit 120 may generate a second response value corresponding to the second challenge value.

The memory 130 may store various data that are used by at least one component (e.g., the processor 150) of an IoT device (e.g., 100A). The data may include software and input data or output data for an instruction related to the software, for example. For example, the memory 130 may store at least one instruction for providing a PUF-based authentication service.

The memory 130 may include various forms of volatile memory or non-volatile memory. For example, the memory may include read only memory (ROM) and random access memory (RAM). In an embodiment of present disclosure, the memory may be disposed inside or outside the processor. The memory 130 may be connected to the processor 150 through various means that have already been known.

The communication module 140 may support the establishment of a communication channel or a wireless communication channel between an IoT device (e.g., 100A) and another device (e.g., the authentication server 200) and the execution of communication through the established communication channel. The communication channel may include at least one communication channel, among Zigbee, NFC, Wi-Fi, and Wibro, for example.

The processor 150 may control at least another component (e.g., a hardware or software component) of an IoT device (e.g., 100A), and may perform various data processing or operations. The processor 150 may include at least one of a central processing unit (CPU), a graphic processing unit (GPU), a micro processor, an application processor, an application specific integrated circuit (ASIC), and field programmable gate arrays (FPGA), for example, and may have a plurality of cores.

The processor 150 may generate the first response value corresponding to the first challenge value that has been previously registered using the WPUF circuit 110 by executing at least one instruction.

The processor 150 may generate a current session key (i.e., a round key) based on the first response value, and may encrypt the current session key into a first random number (or a first random nonce) to transmit the current session key to the authentication server 200. The processor 150 may generate the session key by applying a hash function to a pre-registerd private key ($K_{i-1}$) and the first response value.

The processor 150 may previously register PUF-based authentication information in the authentication server 200 and then store the private key and the first response value in the ROM-BIOS of the WPUF circuit 110. The processor 150 may mask the first random number by applying exclusive OR to the first random number and the session key, and may transmit the masked first random number.

The processor 150 may generate a first message authentication code by applying the hash function to the result of the connection of the session key and the first random number, and may transmit the first message authentication code to a database 220 of the authentication server 200 in relation to a pre-registered pseudo identity. Accordingly, the authentication server 200 may authenticate an IoT device (e.g., 100A) based on the pseudo identity.

As the authentication server 200 authenticates an IoT device (e.g., 100A) based on the first random number and the session key, the processor 150 may receive, from the authentication server 200, some of a challenge-response pair (CRP) and the second random number.

The processor 150 may generate the second response value corresponding to the second challenge value, among some of the CRP, using the RPUF circuit 120, and may authenticate the authentication server 200 by comparing the second response value with some of the CRP. For example, the processor 150 may check whether a hamming distance between the generated second response value and portions corresponding to the second response value in the some of the CRP is within a specified distance, and may authenticate the authentication server 200 when the hamming distance is within the specified distance.

When completing the authentication, the processor 150 may update the session key, the second challenge value, and the second response value for a next session.

For example, when completing the authentication about the authentication server 200 is completed, the processor 150 may designate the private key as the session key for the next session. The processor 150 may update the pseudo identity for the next session by applying a hash function to the pseudo identity in relation to the updated second response value. The processor 150 may update the second challenge value for a next session by applying the hash function to the first random number, the second random number, and the second challenge value. As the updated second challenge value is input to the RPUF circuit 120, the processor 150 may update the second response value for a next session.

Referring to FIG. 2, the authentication server 200 according to an embodiment may include a communication module 210, the database 220, and a processor 230. In an embodiment, some components of the authentication server 200 may be omitted, or an additional component may be further included in the authentication server 200. Furthermore, some of the authentication server 200 may be combined to constitute one entity, but may perform the same function as that of the corresponding components prior to the combination. For example, the database 220 may include first memory related to an operation of the authentication server 200 and second memory that stores authentication-related data. The second memory may be prepared in a device different from the authentication server 200.

The communication module 210 may support the establishment of a communication channel or a wireless communication channel between the authentication server 200 and another device (e.g., the IoT device 100) and the execution of communication through the established communication channel. The communication channel may include at least one the communication channel, among Zigbee, NFC, Wi-Fi, and Wibro, for example.

The database 220 may store various data that are used by at least one component (e.g., the processor 230) of the authentication server 200. The data may include software and input data or output data for an instruction related to the software, for example. For example, the database 220 may store at least one instruction for providing a PUF-based authentication service. The database 220 may include various forms of volatile memory or non-volatile memory. For example, the database 220 may include ROM and RAM. In an embodiment of this writing, the memory may be disposed inside or outside the processor 230. The database 220 may be connected to the processor 230 through various means that have already been known.

The processor 230 of the authentication server 200 may receive a first response value that has been generated and encrypted from a first challenge value selected through the WPUF of an IoT device (e.g., 100A) and that has been transmitted by the IoT device (e.g., 100A) for an authentication request, a pseudo identity, and a first random number, from the IoT device (e.g., 100A).

The processor 230 may obtain the first response value, a second challenge value, a second response value, and a session key corresponding to the received pseudo identity, among authentication-related data, and may authenticate an IoT device (e.g., 100A) by comparing the obtained first response value with the received first response value based on the obtained session key.

The processor 230 may update the authentication-related data including the second challenge value and the second response value for a next session by using the RPUF circuit 120 of an IoT device (e.g., 100A). For example, the processor 230 may generate a second random number (or a second random nonce), and may mask the second random number by performing exclusive OR on the obtained session key and the generated second random number. The processor 230 may further transmit the masked second random number to an IoT device (e.g., 100A).

When receiving a second response value for a next session, which has been masked based on the session key, from the IoT device, the processor 230 may release the masking of the second response value for the next session using the session key, and may update the database 220 with the second response value for the next session.

The processor 230 may receive some of the encrypted second response value from an IoT device (e.g., 100A), and may restore some of the second response value using the obtained session key. The processor 230 may authenticate the IoT device (e.g., 100A) based on a hamming distance between some of the restored second response value and some of the obtained second response value.

When completing the authentication, the processor 230 may update authentication-related data for the IoT device (e.g., 100A). For example, the processor 230 may update the second challenge value for a next session based on the first random number, the second random number, and the second challenge value. The processor 230 may update the pseudo identity for a next session based on a second response value of the next session. The processor 230 may apply a hash f session key and the first response value and update the session key for the next session.

As described above, an IoT device (e.g., 100A) according to an embodiment can provide an IoT device lightweight authentication scheme based on the PUF that is dynamically reconfigurable without the intervention of a user.

Furthermore, an IoT device (e.g., 100A) according to an embodiment can apply a lightweight authentication solution because the PUF is applied to a generalized IoT device (e.g., 100A) that supports low specification computing performance.

Furthermore, an IoT device (e.g., 100A) and the authentication server 200 according to an embodiment can significantly reduce social and economic losses occurring due to a security issue which occurs due to the leakage of sensitive information attributable to hacking, a man-in-the-middle (MITM) attack, or the forgery and alteration of data by preventing the security issue.

Furthermore, an IoT device (e.g., 100A) and the authentication server 200 according to an embodiment can provide a secure solution corresponding to a machine learning-based modeling attack using hacking or an exposed CRP if an attacker hacks the authentication server or the CRP is exposed due to a potential security threat.

Figure 3:
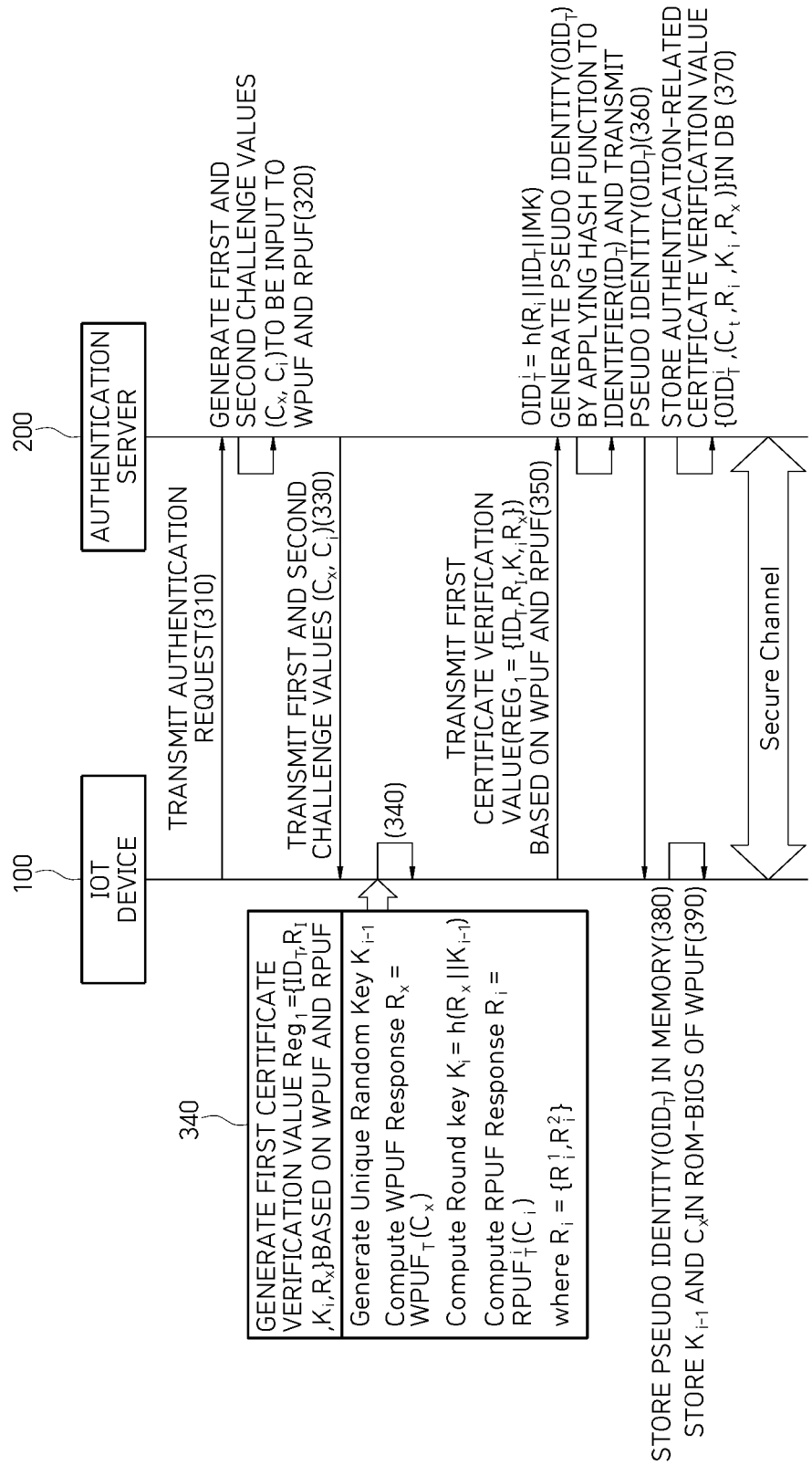
FIG. 3 illustrates a flowchart of an IoT authentication and registration method based on a PUF according to an embodiment.

FIG. 3 illustrates a flowchart of an IoT authentication and registration method based on the PUF according to an embodiment.

Referring to FIG. 3, in operation 310, an IoT device (e.g., 100A) may transmit a registration request message to the authentication server 200.

In operation 320, the authentication server 200 may generate a first challenge value and a second challenge value to be input to the WPUF circuit 110 and RPUF circuit 120 of the IoT device (e.g., 100A), respectively, as a response to the registration request message of the IoT device (e.g., 100A). The first challenge value may be a challenge value that has been generated by the WPUF circuit of the authentication server 200. The second challenge value may be a challenge value that has been generated by the RPUF circuit of the authentication server 200. The authentication server 200 may transmit and receive data (e.g., the first and second challenge values) to and from an IoT device (e.g., 100A) through a secure channel, such as TLS 1.2/1.3.

In operation 330, the authentication server 200 may transmit the generated first challenge value and second challenge value to the IoT device (e.g., 100A).

In operation 340, the IoT device (e.g., 100A) may generate a first certificate verification value based on a unique random key ($K_{i-1}$), a device identifier ($ID_T$), the first challenge value ($C_x$), and the second challenge value ($C_i$) using a hash function, the WPUF circuit 110, and the RPUF circuit 120.

In operation 341, the IoT device (e.g., 100A) may generate a unique random private key ($K_{i-1}$).

In operation 342, the IoT device (e.g., 100A) may generate a first response value ($R_x$) inputting the first challenge value ($C_x$) to the WPUF circuit 110.

In operation 343, the IoT device (e.g., 100A) may generate a round key ($K_i$) by applying the hash function to the results of the connection of the first response value ($R_x$) and the private key ($K_{i-1}$) according to Equation 1.

$$K_I = h(R_X \| K_{I-1}) \quad (1)$$

In operation 344, the IoT device (e.g., 100A) may generate a second response value (($R_i = \{R_i^1, R_i^2\}$)) by inputting the second challenge value ($C_i$) to the RPUF circuit 120.

In operation 350, the IoT device (e.g., 100A) may transmit the first certificate verification value $Reg_1 = \{ID_T, R_I, K_i, R_x\}$, including first response value ($R_x$), second response value ($R_I$), round key ($K_i$) and the identifier ($ID_T$) of the IoT device (e.g., 100A), to the authentication server 200.

In operation 360, when receiving the first certificate verification value $Reg_1 = \{ID_T, R_I, K_i, R_x\}$, the authentication server 200 may mask at least some of the first certificate verification value. For example, the authentication server 200 may confirm the identifier ($ID_T$) of the IoT device (e.g., 100A) and second response value ($R_I$) based on the first certificate verification value. As in Equation 2, the authentication server 200 may generate a pseudo identity ($OID_T$) corresponding to the masked identifier by applying a hash function to the identifier, the second response value, and the master key (MK) of the authentication server 200 correlated each other (e.g., connect in parallel).

$$OID_T^i = h(R_X \| ID_T \| MK) \quad (2)$$

In operation 370, the authentication server 200 may store, in the database 220, an authentication-related certificate verification value including the pseudo identity, the second challenge value ($C_i$), the second response value ($R_I$), and the round key ($K_i$). The authentication server 200 may transmit the pseudo identity ($OID_T$) to the IoT device (e.g., 100A).

In operation 380, the IoT device (e.g., 100A) may receive the pseudo identity ($OID_T$) from the authentication server 200 and store the pseudo identity ($OID_T$) in the memory 130.

In operation 390, the IoT device (e.g., 100A) may store the random private key ($K_{i-1}$) and the first challenge value ($C_x$) in the ROM-BIOS attached to the WPUF circuit 110. The IoT device (e.g., 100A) can prevent the exposure of related information by deleting information of an authentication process except the pseudo identity, the random private key, and the first challenge value.

Figure 4:
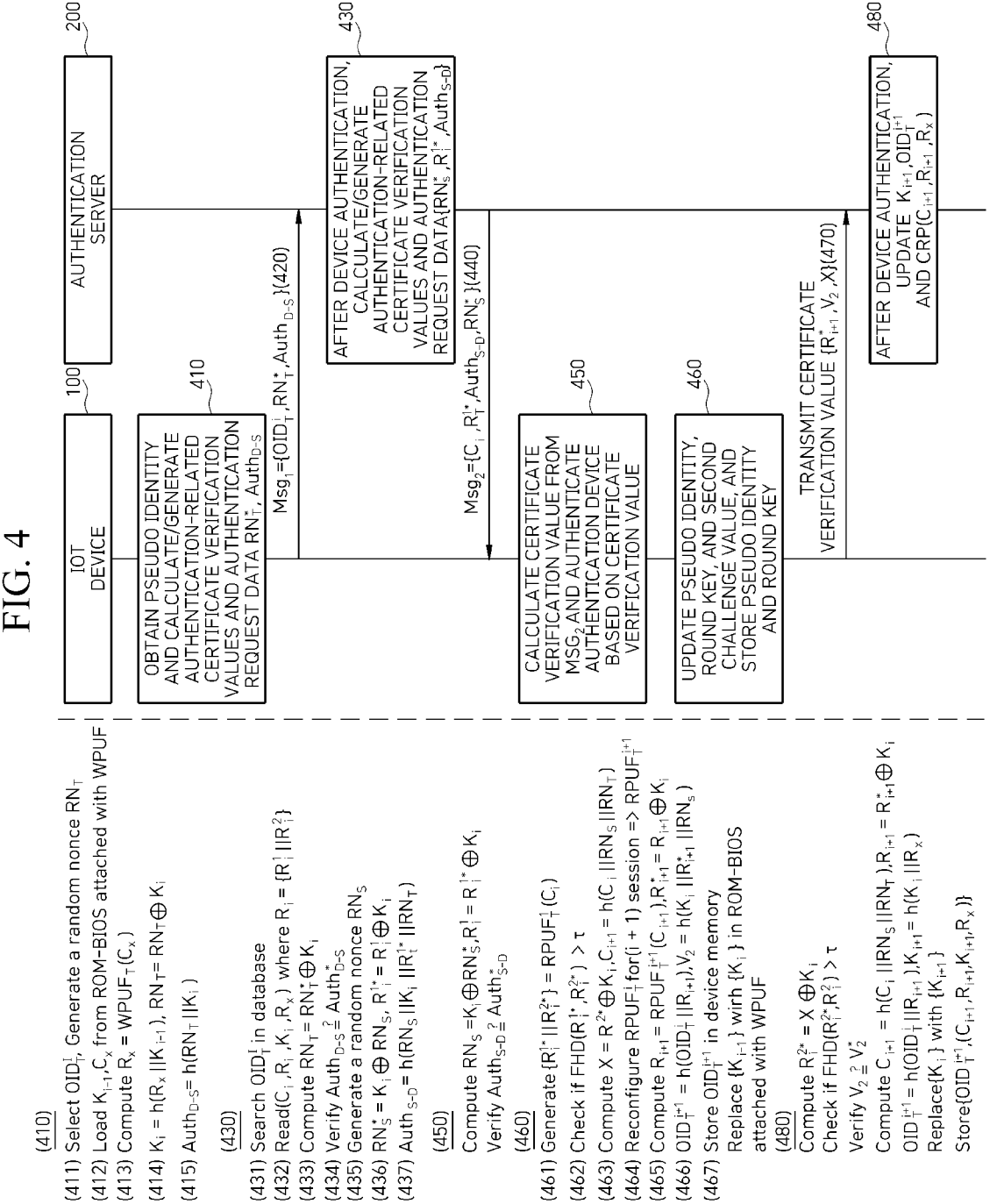
FIG. 4 illustrates a flowchart of a method of authenticating an IoT device based on a PUF according to an embodiment.

FIG. 4 illustrates a flowchart of a method of authenticating an IoT device based on a PUF according to an embodiment.

Referring to FIG. 4, in operation 410, an IoT device (e.g., 100A) may generate an authentication-related certificate verification value and a message authentication code {$K_i$, $RN_T^*$, $Auth_{D-S}$}.

In operation 411, the IoT device (e.g., 100A) may select (or obtain) a pseudo identity ($OID_T^i$) stored in the memory 130, and may generate a first random nonce ($RN_T$).

In operation 412, the IoT device (e.g., 100A) may obtain (e.g., load) a unique private key ($K_i$–1) and a first challenge value ($C_x$) from the ROM-BIOS attached to the WPUF circuit 110.

In operation 413, the IoT device (e.g., 100A) may calculate a first response value ($R_x$) by inputting the first challenge value ($C_x$) to the WPUF circuit 110.

In operation 414, the IoT device (e.g., 100A) may generate a round key ($K_i$) (may be hereinafter referred to as a "first round key") for a current session by applying a hash function to the first response value ($R_x$) and the private key ($K_i$–1). Furthermore, the IoT device (e.g., 100A) may generate a masked first random nonce ($RN_T^*$) by applying a specified operation (e.g., exclusive OR) to the first round key ($K_i$) and the first random nonce ($RN_T$).

In operation 415, the IoT device (e.g., 100A) may generate a first message authentication code ($Auth_{D-S}$) by applying a hash function to the first round key ($K_i$) and the masked first random nonce ($RN_T^*$).

In operation 420, the IoT device (e.g., 100A) may transmit, to the authentication server 200, a first message ($MSG_1$) ={$OID_T^i$, $RN_T^*$, $Auth_{D-S}$} including authentication-related certificate verification values, for example, the pseudo identity ($OID_T^i$) and the masked first random nonce ($RN_T^*$), and the message authentication code ($Auth_{D-S}$).

In operation 430, the authentication server 200 may authenticate the IoT device (e.g., 100A) based on the authentication-related certificate verification values and the message authentication code that are included in the first message.

In operation 431, the authentication server 200 may search the database 220 for the pseudo identity ($OID_T^i$) of the IoT device (e.g., 100A) included in the first message, and may compare the searched pseudo identity and the pseudo identity included in the first message as to whether the retrieved pseudo identity and the pseudo identity included in the first message are identical with each other.

In operation 432, the authentication server 200 may obtain, from the database 220, a certificate verification value ($C_i$, $R_i$, $K_i$, $R_x$) of the IoT device (e.g., 100A) corresponding to the pseudo identity ($OID_T^i$) that has been stored in the authentication registration step.

In operation 433, the authentication server 200 may obtain a first random nonce ($RN_T$) by performing a specified operation (e.g., exclusive OR) on the round key ($K_i$) of the certificate verification value obtained from the database 220 and the masked first random nonce ($RN_T^*$) of the first message.

In operation 434, the authentication server 200 may generate a second message authentication code ($Auth_{D-S}^*$), and may compare the second message authentication code and the first message authentication code ($Auth_{D-S}$) to verify whether the IoT device (e.g., 100A) is a legitimate device being previously registered. In operation 434, when the second message authentication code is identical with the first message authentication code, the authentication server 200 may authenticate the IoT device (e.g., 100A) as a legitimate device.

In operation 435, when the IoT device (e.g., 100A) is authenticated, the authentication server 200 may generate a second random nonce ($RN_S$).

In operation 436, the authentication server 200 may obtain the second random nonce ($RN_S$) by performing a specified operation (e.g., exclusive OR) on the generated second random nonce ($RN_S$) and the round key ($K_i$). In operation 436, the authentication server 200 may generate a masked second random nonce ($RN_S^*$) and some ($R_i^{1*}$) of the masked second response value by performing a specified operation (e.g., exclusive OR) on each of the second random nonce and the round key ($K_i$), and some ($R_i^1$) of the second response value and the round key ($K_i$).

In operation 437, the authentication server 200 may correlate the second random nonce ($RN_S$), the round key ($K_i$), some ($R_i^{1*}$) of the masked second response value, and the first random nonce ($RN_T$) each other. And the authentication server 200 may generate a third message authentication code ($Auth_{S-D}$) applying a hash function to the second random nonce ($RN_S$), the round key ($K_i$), some ($R_i^{1*}$) of the masked second response value, and the first random nonce ($RN_T$) correlated each other.

In operation 440, the authentication server 200 may transmit a second message, including the second challenge value ($C_i$), some ($R_i^{1*}$) of the masked second response value, the third message authentication code ($Auth_{S-D}$), and the masked second random nonce ($RN_S^*$), to the IoT device (e.g., 100A) through wireless communication.

In operation 450, the IoT device (e.g., 100A) may calculate a certificate verification value ($RN_S$, $R_i^1$) by performing a specified operation (e.g., an exclusive OR operation) on each of the masked second random nonce ($RN_S^*$) and some ($R_i^{1*}$) of the masked second response value, which have been included in the first message, along with the round key ($K_i$). The IoT device (e.g., 100A) may generate a fourth message authentication code ($Auth_{S-D}^*$) using the certificate verification value, and may compare the fourth message authentication code ($Auth_{S-D}$) and the third message authentication code ($Auth_{S-D}$) to verify whether authentication server 200 that sent the third message is pre-registerd and legitimate. When the fourth message authentication code is identical with the third message authentication code, the IoT device (e.g., 100A) may verify and authenticate that the authentication server 200 which sent the third message authentication code is a legitimate device.

In operation 460, when the authentication of the authentication server 200 is completed, the IoT device (e.g., 100A) may update pieces of sensitive information within the memory 130.

In operation 461, the IoT device (e.g., 100A) may generate {$R_i^{1*}R_i^{2*}$} by inputting the second challenge value to the RPUF circuit 120.

In operation 462, the IoT device (e.g., 100A) may calculate a hamming distance ($FHD(R_i^{1*},R_i^1)$) between some character strings of the masked second response value and some character strings of the second response value from the authentication server 200.

As in operations 463 to 466, when the measured hamming distance is within a specified distance (τ), the IoT device (e.g., 100A) may update the round key and the pseudo identity with a new round key ($K_{i+1}$) and a pseudo identity ($OID_T^{i+1}$) and store the new round key and the new pseudo identity. The specified distance may be set based on a hamming distance between $\{R_i^{1*}, R_i^1\}$.

In operation 463, the IoT device (e.g., 100A) may calculate some $X(X-R_i^{2*} \oplus K + R_i^{2*} \oplus k_i)$ of a certificate verification value by performing a specified operation (e.g., exclusive OR) on the remainder ($R_i^{2*}$) of the masked second response value and the round key ($K_i$).

Furthermore, the IoT device (e.g., 100A) may calculate an (i+1)-th second challenge value ($C_{i+1}$, $C_{i+1}=h(C_i||RN_S||RN_T)$) by applying a hash function to the second challenge value, the first random nonce, and the second random nonce.

In operation 464, the IoT device (e.g., 100A) may (i+1)-th second response value ($R_{i+1}$) by generate an inputting the (i+1)-th first second challenge value ($C_{i+1}$) to the RPUF circuit 120.

In operation 465, the IoT device (e.g., 100A) may generate a masked second response value ($R_{i+1}$) by performing a specified operation on the second response value ($R_{i+1}$) and the round key ($K_i$).

In operation 466, the IoT device (e.g., 100A) may generate an (i+1)-th pseudo identity by applying a hash function to the pseudo identity and the second response value ($R_{i+1}$). And the IoT device (e.g., 100A) may generate the remainder value ($V_2$) of the certificate verification value by connecting the round key ($K_i$), the masked second response value ($R_{i+1}$), and the second random nonce and applying a hash function to the round key ($K_i$), the masked second response value ($R_{i+1}$), and the second random nonce.

In operation 467, the IoT device (e.g., 100A) may store an updated pseudo identity ($OID_T^i$) in the memory 130, and may store a unique key ($K_i$) in the ROM-BIOS of the WPUF circuit 110 by replacing the unique key ($K_{i-1}$) with the unique key ($K_i$).

In operation 470, the IoT device (e.g., 100A) may transmit an updated certificate verification value $\{R_{i+1}^*, V_2, X\}$ to the authentication server 200.

In operation 480, the authentication server 200 calculates the remainder ($R_i^2$) of the second response value by using the round key ($K_i$). And the authentication server 200 may measure a hamming distance ($FHD(R_i^{2*}, R_i^2)$) between the calculated reminder of the second response value and a reminder of the stored second response value in the Database 220. When a calculated reminder is within a specific distance like $FHD(R_i^{2*}, R_i^2) > \tau$ with the stored reminder, the authentication server 200 may update the round key ($K_{i+1}$), the pseudo identity ($OID_T^{i+1}$), and a CRP ($C_{i+1}$, $R_{i+1}$, $R_x$) value within the database in order to defend a replay attack and a machine learning-based modeling attack, and may terminate the mutual authentication process.

Figure 5:
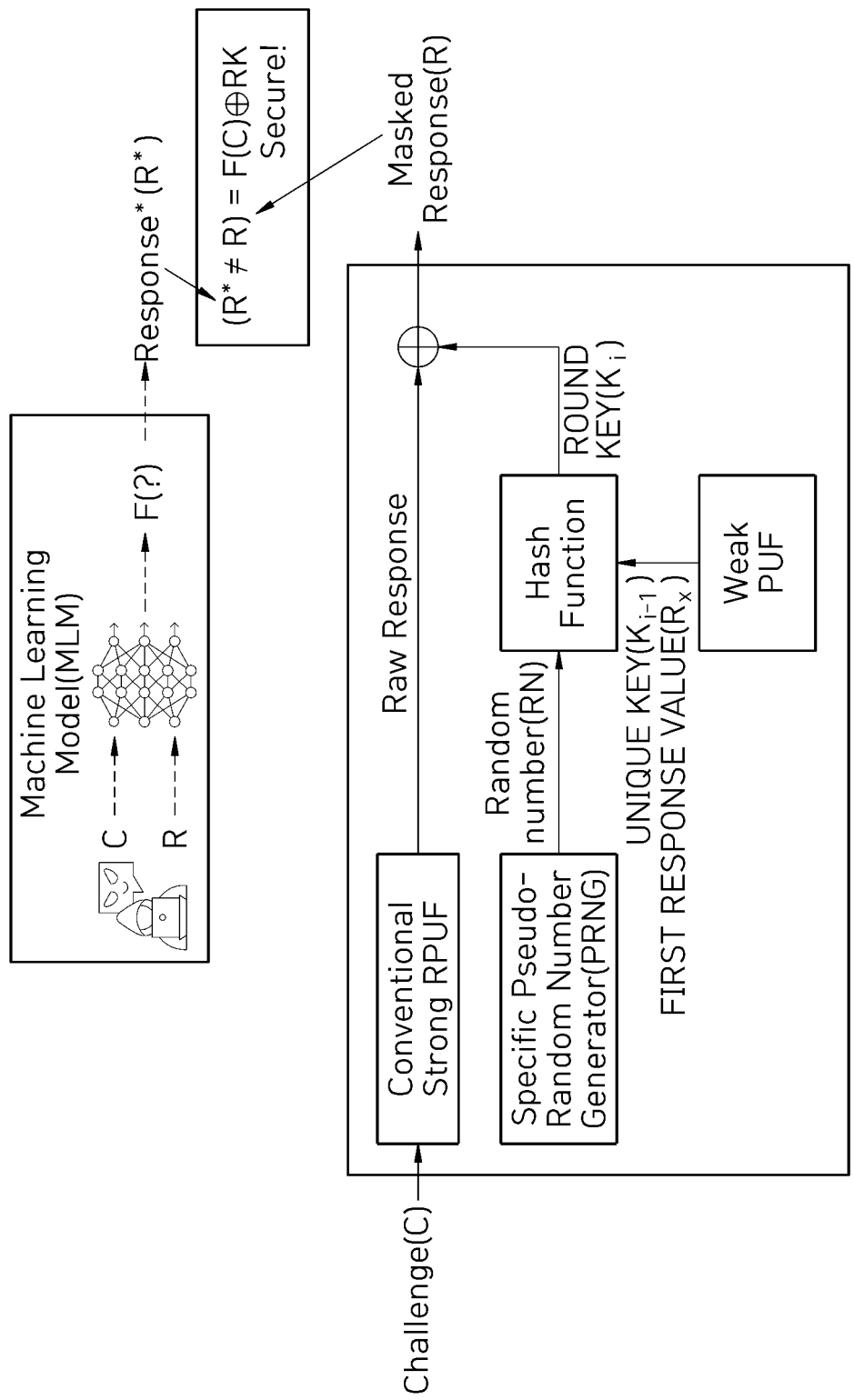
FIG. 5 illustrates effects of the IoT authentication method based on the PUF upon machine learning-based modeling attack according to an embodiment.

FIG. 5 illustrates effects of the IoT authentication method based on the PUF upon machine learning-based modeling attack according to an embodiment.

Referring to FIG. 5, when receiving a first challenge value, an IoT device (e.g., 100A) may generate a unique private key (i.e., a first response value) by inputting the first challenge value to the WPUF circuit 110. The LOT device (e.g., 100A) may generate a random nonce ($RN_T$) by using a pseudo random number generator (PRNG). The IoT device (e.g., 100A) may generate a round key ($K_i$) to be used in a current session by applying a hash function to the first response key and the random nonce.

The IoT device (e.g., 100A) may generate a second response value by inputting a second challenge value to the RPUF circuit 120. And The IoT device (e.g., 100A) may generate a masked second response value by performing an exclusive OR operation on the second response value and the round key. The IoT device (e.g., 100A) may use the masked second response value for authentication credentials.

According to embodiment, an although the authentication server 200 is hacked by a malicious attack or multiple CRPs are exposed through a public channel and thus a machine learning-based modeling attack is attempted by the multiple CRPs, the malicious attacker cannot predict a masked response value bit string with respect to an arbitrary challenge value. Accordingly, an IoT device (e.g., 100A) embedded in WPUF circuit 110 and the RPUF circuit 120 can safely maintain security against a machine learning-based modeling attack in addition to a popular security attack, such as a replay attack or a man-in-the-middle attack.

According to an embodiment, PUF-based authentication is based on the principle that integrated circuit (IC) chips return different response values with respect to the same challenge value by providing digital values that are different and unique and that cannot be predicted although the IC chips are produced by the same process. Accordingly, a CRP value of each WPUF circuit 110 may be used to generate and store a unique private key for authenticating each IoT device (e.g., 100A).

Figure 6:
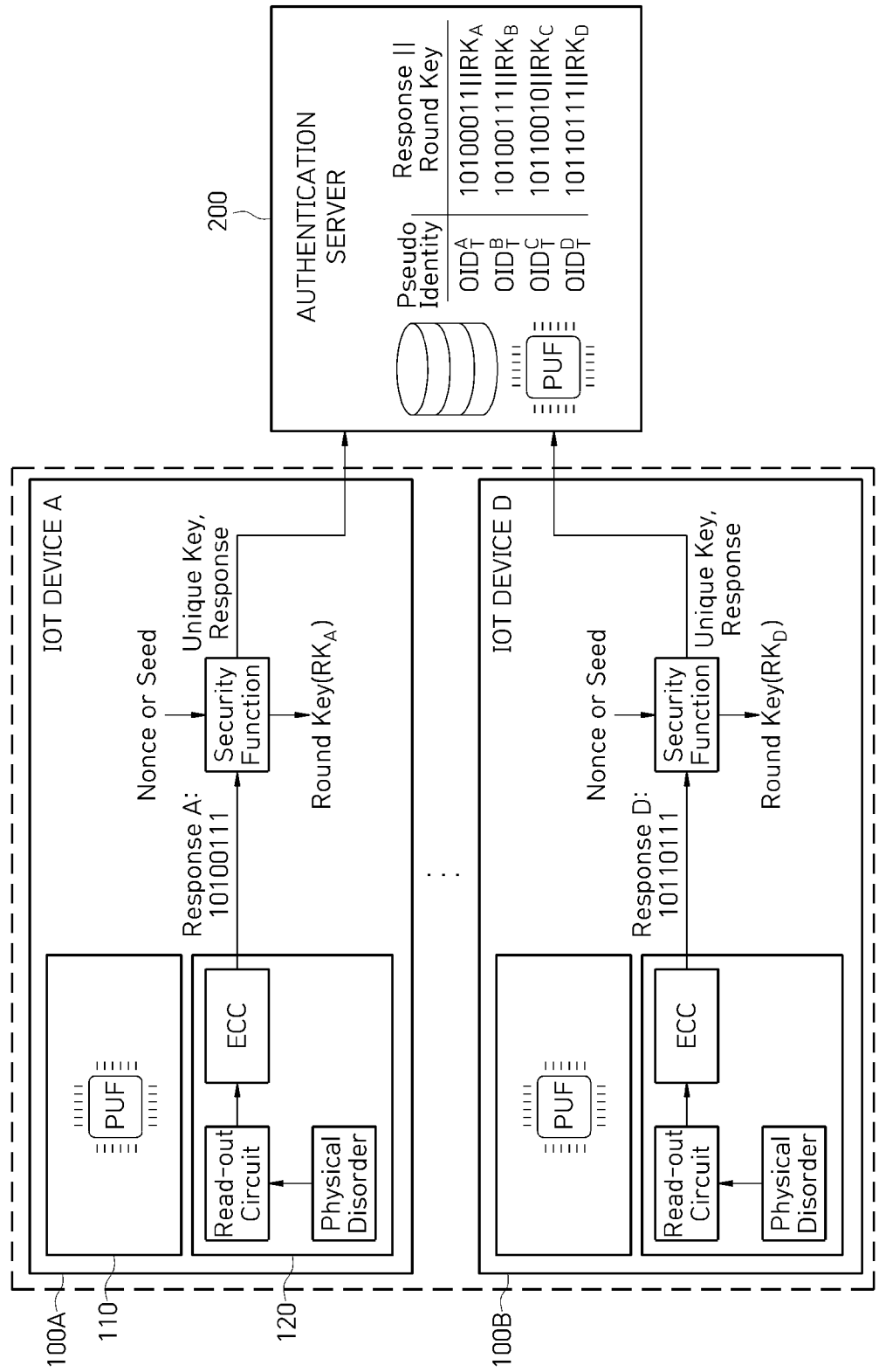
FIG. 6 is a diagram illustrating effects of an authentication method based on a WPUF circuit 110 according to an embodiment.

FIG. 6 is a diagram illustrating effects of an authentication method based on the WPUF circuit 110 according to an embodiment.

Referring to FIG. 6, according to an embodiment, in an initialization step, an IoT device (e.g., 100A) may generate a CRP set based on the WPUF circuit 110 and store the CRP set in the database 220 of the authentication server 200. The IoT device (e.g., 100A) may generate an authentication-related certificate verification value, including a first response value generated by the WPUF circuit 110 embedded in the IoT device (e.g., 100A) and a private key (or a round key) for future IoT authentication. And The IoT device (e.g., 100A) may store the authentication-related certificate verification value in the database 220 of the authentication server 200.

In an evaluation step, when an authentication request is input to the IoT device 100A, the authentication server 200 may transmit a first challenge value selected by the IoT device 100A to the IoT device (e.g., 100A). The IoT device (e.g., 100A) may generate a first response value corresponding to the received first challenge value through the WPUF circuit 110, and may transmit a message authentication code (MAC, $Auth_{D-S}$), including the first response value and a unique private key, to the authentication server 200 as a response. The authentication server 200 may verify that the unique private key is a unique private key for authenticating the IoT device (e.g., 100A) by verifying whether the first challenge value stored therein and the first response value are identical with each other.

According to an embodiment, in the IoT authentication method based on the WPUF, when a malicious attacker generates a first response value by using a forged first challenge value and transmits the first response value to the authentication server 200, the authentication server 200 can reject the authentication request, so that corresponding session may be terminated. Because some of CRP values stored in the authentication server 200 is not identical with some of a received CRP value and thus the received CRP value cannot be verified based on a message authentication code (MAC) including a unique private key in the authentication request process.

The RPUF circuit 120 according to an embodiment may be used to authenticate each IoT device through a CRP.

Figure 7:
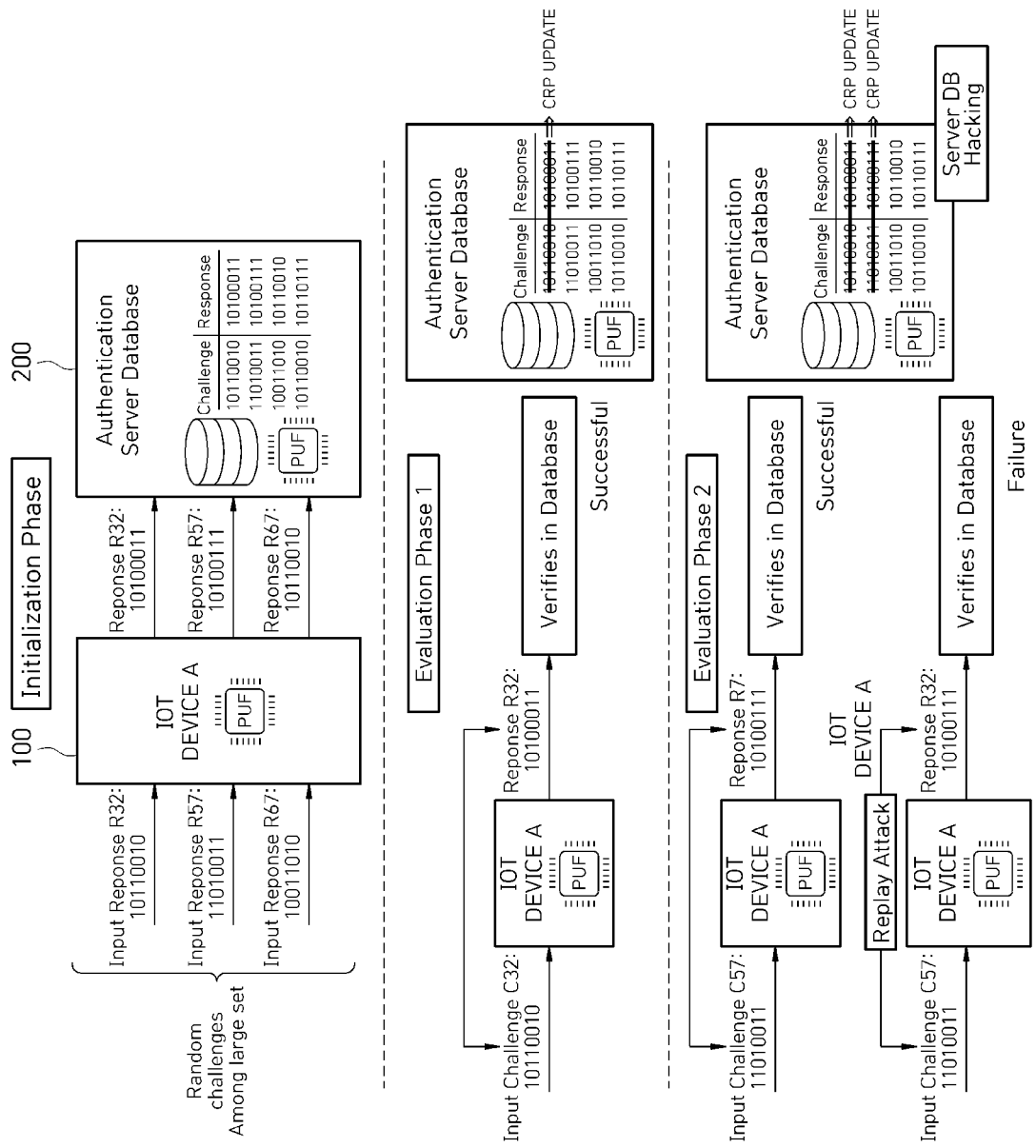
FIG. 7 is a diagram for describing RPUF-based IoT authentication according to an embodiment.

FIG. 7 is a diagram for describing RPUF-based IoT authentication according to an embodiment.

Referring to FIG. 7, in an initialization step, the authentication server 200 may previously store a CRP set corresponding to each IoT device (e.g., 100A) in the database 220. And the authentication server 200 may authenticate the IoT device (e.g., 100A) by verifying the CRP set based on a comparison between the CRP set and a CRP that is generated through the embedded RPUF circuit 120 of the IoT device 100A) to be subsequently (e.g., authenticated.

In an evaluation step, when an authentication request is input to the IoT device (e.g., 100A), the authentication server 200 may transmit a selected second challenge value to the IoT device (e.g., 100A). The IoT device (e.g., 100A may generate a second response value corresponding to the received second challenge value using the RPUF circuit 120 as a response. And The IoT device (e.g., 100A) may transmit the generated second response value to the authentication server 200. The authentication server 200 may authenticate the IoT device (e.g., 100A) by verifying whether a CRP value of CRPs stored in the database is identical with the received second response value from the IoT device (e.g., 100A). For example, the authentication server 200 may confirm the IoT device (e.g., 100A) when the CRP value (second response value) stored in the database is identical with the CRP value from received CRP value (second response value) from the IoT device (e.g., 100A) based on a hamming distance.

The authentication server 200 may update the CRPs stored in the database 220 by dynamically reconfiguring the CRPs, and can safely transmit an updated challenge to the IoT device (e.g., 100A).

In the IoT authentication method based on the PUF according to an embodiment, if a malicious attacker attempts a replay attack to make a camouflage attempt by reusing a CRP 1 after a corresponding IoT device is authenticated, a CRP is used already dynamically reconfigured as a new CRP and is not continuously used. Accordingly, an authentication request from the corresponding IoT device can be rejected, and a current session may be terminated.

Furthermore, although an IoT device generates a second response value using a forged second challenge value and transmits the second response value to the authentication server 200, the authentication server 200 can reject a corresponding authentication request and terminate a corresponding session because a CRP received from the IoT device is not identical with CRPs stored in the authentication server 200.

As described above, the IoT authentication method based on the PUF according to an embodiment can provide IoT device lightweight authentication based on dynamically reconfigurable PUF without the intervention of a user by dually verifying the legitimacy of IoT authentication based on the WPUF circuit 110 and the RPUF circuit 120.

Furthermore, the IoT authentication method based on the PUF according to an embodiment can provide a lightweight authentication solution which may be applied to a generalized IoT device that provides low specification computing performance.

Furthermore, the IoT authentication method based on the PUF according to an embodiment can provide a security solution corresponding to a machine learning-based modeling attack using hacking or an exposed CRP if an attacker hacks an authentication server or the CRP is exposed due to a security threat.

The IoT authentication method based on the PUF according to an embodiment can prevent a security issue occurring due to the leakage of sensitive information attributable to the hacking of an authentication server, a man-in-the-middle (MITM) attack, and the forgery and alteration of data, and can significantly reduce social and economical losses occurring due to the security issue.

FIG. 8 illustrates a flowchart of an IoT authentication method based on the PUF by an IoT device according to an embodiment.

Referring to FIG. 8, in operation 810, an IoT device (e.g., 100A) may generate a first response value corresponding to a first challenge value by using the WPUF.

In operation 820, the IoT device (e.g., 100A) may generate a round key for a current session based on the first response value, and may then transmit the round key to the authentication server 200 in relation to a first random nonce.

In operation 830, the IoT device (e.g., 100A) may receive some of a challenge-response pair (CRP) previously registered and a second random nonce from the authentication server 200. In this regard, the authentication server 200 may transmit the some of CRP and the second random nonce as the results of authentication based on the first random nonce and the round key. The second random nonce may be masked and transmitted as the second random nonce and the round key are subjected to an exclusive OR operation.

In operation 840, the IoT device (e.g., 100A) may authenticate the authentication server 200 based on the round key, some of the CRP, and the second random nonce.

In operation 850, the IoT device (e.g., 100A) may update the round key and the CRP for a next session based on the results of the input of some of the CRP to the WPUF. For example, the IoT device (e.g., 100A) may update a second challenge value for a next session by applying a hash function to the first random nonce, the second random nonce, and the second challenge value among some of the CPR.

Various embodiments of this document and terms used in the embodiments are not intended to limit the technical characteristics, described in this document, to specific embodiments, and should be understood as including various changes, equivalents or alternatives of a corresponding embodiment. In relation to the description of the drawings, similar reference numerals may be used for similar or related components. A singular form of a noun corresponding to an item may include one item or a plurality of items unless explicitly described otherwise in the context. In this document, each of phrases, such as "A or B", "at least one of A and B", "at least one of A or B", "A, B or C", "at least one of A, B and C", and "at least one of A, B, or C", may include any one of items listed along with a corresponding one of the phrases or all possible combinations of the listed items. Terms, such as "a first", "a second", or "the first" or "the second", may be used to merely distinguish between a corresponding component and another corresponding component, and do not limit corresponding components in another aspect (e.g., importance or a sequence). If any (e.g., a first) component is described as being "coupled" or "connected" to another (e.g., a second) component along with a term "functionally" or "communicatively" or without such a term, this means that the any component may be coupled to the another component directly (e.g., in a wired way), wirelessly, or through a third component.

The term "module" used in this document may include a unit implemented as hardware, software or firmware, and may be interchangeably used with a term, such as logic, a logical block, a part, or a circuit. The module may be an integrated part, or a minimum unit of the part or a part thereof, which performs one or more functions. For example, according to an embodiment, the module may be implemented in the form of an application-specific integrated circuit (ASIC).

Various embodiments of this document may be implemented as software (e.g., a program) including one or more instructions stored in a storage medium (e.g., the memory 130) (E.G., embedded memory or external memory) readable by a machine (e.g., the IoT device 100). For example, a processor (e.g., the processor 150) of a machine (e.g., an IoT device (e.g., 100A) may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The machine-readable storage media may be provided in the form of a non-transitory storage medium. In this case, "non-transitory" merely means that the storage medium is a tangible device and does not include a signal (e.g., electromagnetic wave). The term does not distinguish between a case where data is semi-permanently stored in the storage medium and a case where data is temporally stored in the storage medium.

According to an embodiment, the method according to various embodiments disclosed in this document may be included in a computer program product and provided. The computer program product may be traded as a product between a seller and a purchaser. The computer program product may be distributed in the form of a machine-readable storage medium (e.g., a compact disc read only memory (CD-ROM)) or may be distributed through an app store (e.g., PlayStore™) or directly between two user devices (e.g., smartphones) or online (e.g., download or upload). In the case of the online distribution, at least some of the computer program products may be at least temporarily stored or provisionally generated in a machine-readable storage medium, such as the memory of the server of a manufacturer, the server of an app store or a relay server.

The components according to various embodiments of the present disclosure may be implemented in the form of software or hardware, such as a digital signal processor (DSP), a field programmable gate array (FPGA) or an application-specific integrated circuit (ASIC), and may perform given roles. The "components" are not components having meanings limited to software or hardware, and each component may be configured to reside on an addressable storage medium and may be configured to operate at least one of processors. For example, the component may include components, such as software components, object-oriented software components, class components, and task components, processes, functions, attributes, procedures, sub-routines, segments of a program code, drivers, firmware, a microcode, circuitry, data, a database, data structures, tables, arrays, and variables.

According to various embodiments, each (e.g., a module or a program) of the aforementioned components may include a single entity or a plurality of entities. According to various embodiments, at least one of components or operations of the aforementioned components may be omitted or at least one of other components or operations may be added. Alternatively or additionally, a plurality of components (e.g., modules or programs) may be integrated into a single component. In such a case, the integrated component may identically or similarly perform a function performed by a corresponding one of the plurality of components before at least one of functions of each of the plurality of components are integrated. According to various embodiments, operations performed by a module, a program, or another component may be executed sequentially, in parallel, iteratively or heuristically, or at least one of the operations may be executed in different order or may be omitted, or at least one of other operations may be added.

What is claimed is:

1. An Internet of Thing (IoT) device, comprising:
   memory in which at least one instruction is stored; and
   a processor functionally connected to the memory,
   wherein, by executing the at least one instruction, the processor
   generates a first response value corresponding to a first challenge value that has been previously registered by using a weak physical unclonable function (WPUF),
   generates a current session key based on the first response value and transmits the current session key to an authentication server by encrypting the current session key into a first random number,
   when the authentication server authenticates the IoT device based on the first random number and the session key, receives, from the authentication server, some of a challenge-response pair (CRP) being previously registered and a second random number,
   generates a second response value corresponding to a second challenge value, among the some of the CRP, by using a reconfigurable physical unclonable function (RPUF), and
   authenticates the authentication server by comparing the second response value with the some of the CRP and then updates the session key, the second challenge value, and the second response value for a next session.

2. The IoT device of claim 1, wherein the RPUF is a dynamically reconfigurable PUF.

3. The IoT device of claim 1, wherein the WPUF is a PUF in which entropy cells are independent from each other and which supports a low bit error rate.

4. The IoT device of claim 1, wherein the processor
   checks whether a hamming distance between portions corresponding to the generated second response value in the some of the CRP and the second response value is within a specified distance, and
   authenticates the authentication server when the hamming distance is within the specified distance.

5. The IoT device of claim 1, wherein the processor generates the session key by applying a hash function to a pre-registered private key and the first response value.

6. The IoT device of claim 5, wherein the processor
   previously registers PUF-based authentication information in the authentication server, and
   then stores the private key and the first response value in ROM-BIOS of the WPUF.

7. The IoT device of claim 5, wherein the processor designates the private key as the session key for the next session when the authentication server is authenticated.

8. The IoT device of claim 1, wherein the processor
   masks the first random number by applying exclusive OR to the first random number and the session key, and
   transmits the masked first random number.

9. The IoT device of claim 1, wherein the processor
   generates a first message authentication code by applying a hash function to results of a connection of the session key and the first random number, and
   transmits the first message authentication code to a database of the authentication server in relation to a pseudo identity pre-registered so that the authentication server authenticates the IoT device based on the pseudo identity.

10. The IoT device of claim 9, wherein the processor updates the pseudo identity for the next session by applying a hash function to the updated second response value and the pseudo identity.

11. The IoT device of claim 1, wherein the processor
updates the second challenge value for the next session by applying a hash function to the first random number, the second random number, and the second challenge value, and
updates the second response value for the next session by inputting the updated second challenge value to the RPUF.

12. An authentication server for authenticating an Internet of Thing (IoT) device, comprising:
a database in which authentication-related data about at least one IoT device being pre-registered is stored; and
a processor functionally connected to the database, wherein the processor
receives, from a first IoT device, a first response value, a pseudo identity, and a first random number, wherein the first response value is generated and encrypted from a first challenge value being selected through a weak physical unclonable function (WPUF) of the first IoT device for an authentication request,
obtains a first response value, a second challenge value, a second response value, and a session key corresponding to the received pseudo identity, among the authentication-related data,
authenticates the first IoT device by comparing the obtained first response value with the received first response value based on the obtained session key, and
updates authentication-related data comprising the second challenge value and the second response value for a next session by using a reconfigurable physical unclonable function (RPUF) of the first IoT device.

13. The authentication server of claim 12, wherein the processor
generates a second random number, masks the second random number by performing exclusive OR on the obtained session key and the generated second random number, and further transmits the masked second random number to the first IoT device, and
updates the second challenge value for the next session based on the first random number, the second random number, and the second challenge value.

14. The authentication server of claim 13, wherein when receiving the second response value for the next session, being masked based on the session key, from the first IoT device, the processor
releases the masking of the second response value for the next session by using the session key, and
then updates the database with the received second response value.

15. The authentication server of claim 12, wherein the processor
receives encrypted some of the second response value from the first IoT device, and
restores the some of the second response value by using the obtained session key, authenticates the first IoT device based on a hamming distance between some of the restored second response value and some of the obtained second response value, and updates the authentication-related data of the first IoT device.

16. The authentication server of claim 12, wherein the processor updates the pseudo identity for the next session based on the second response value for the next session.

17. The authentication server of claim 12, wherein the processor updates the session key for the next session by applying a hash function to the session key and the first response value.

18. An Internet of Thing (IoT) authentication method based on a physical unclonable function (PUF) by an IoT device, comprising:
generating a first response value corresponding to a first challenge value by using a weak physical unclonable function (WPUF);
generating a current session key based on the first response value and then transmitting the current session key to an authentication server in relation to a first random number;
receiving some of a pre-registered challenge-response pair (CRP), and a second random number from the authentication server, wherein the some of the CRP and the second random number are transmitted as a result of authentication based on the first random number and the session key by the authentication server;
authenticating the authentication server based on the session key, the some of the CRP, and the second random number;
generating a second response value corresponding to a second challenge value, among the some of the CRP, using a reconfigurable physical unclonable function (RPUF); and
authenticating the authentication server by comparing the second response value with the some of the CRP and then updating the session key and the CRP for a next session.

19. The IoT authentication method of claim 18, wherein the transmitting of the current session key comprises masking the first random number by applying exclusive OR to the first random number with the session key; and
transmitting the masked first random number.

20. The IoT authentication method of claim 18, wherein the updating of the session key and the CRP comprises:
updating the second challenge value for the next session by applying a hash function to the first random number, the second random number, and the second challenge value, and
updating the second response value for the next session by inputting the updated second challenge value to the RPUF.

* * * * *